UNITED STATES PATENT OFFICE.

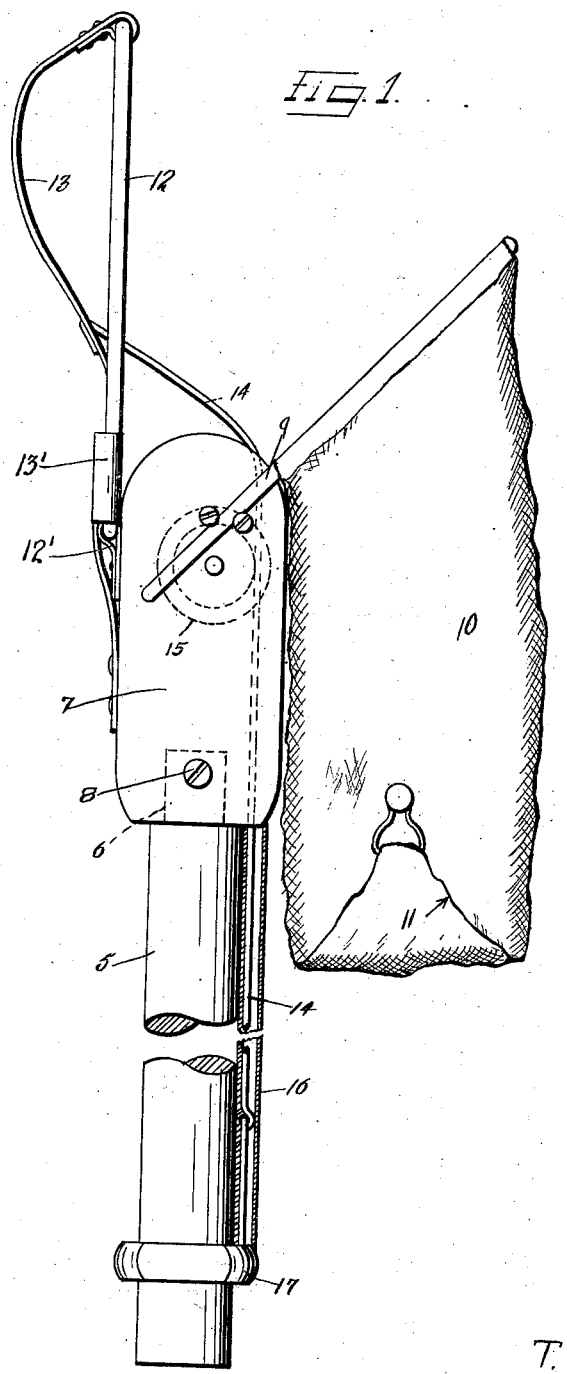

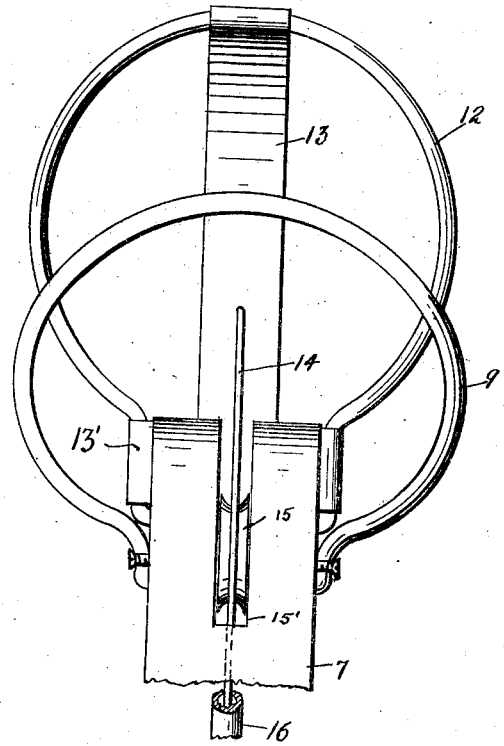
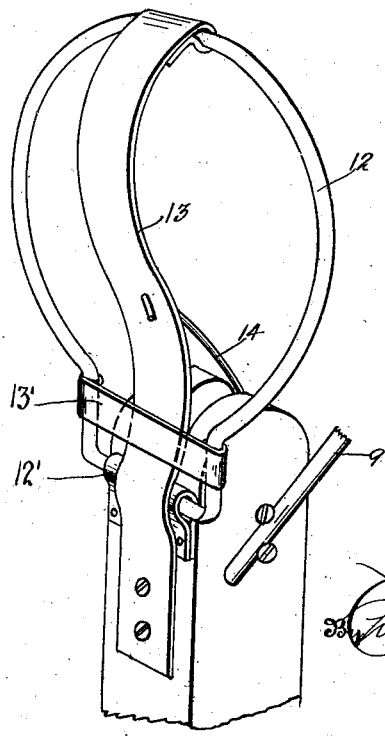

THOMAS HARRISON HEBERLING, OF CANTRALL, ILLINOIS.

FRUIT-PICKER.

987,066. Specification of Letters Patent. Patented Mar. 14, 1911.

Application filed February 25, 1910, Serial No. 545,994. Renewed February 1, 1911. Serial No. 606,008.

*To all whom it may concern.*

Be it known that I, THOMAS H. HEBERLING, a citizen of the United States, residing at Cantrall, in the county of Sangamon, State of Illinois, have invented certain new and useful Improvements in Fruit-Pickers; and I do hereby declare the following to be a full, clear, and exact description of the invention, such as will enable others skilled in the art to which it appertains to make and use the same.

This invention relates to fruit pickers of that general class in which the fruit gathering sack is arranged upon the end of a long rod which latter is equipped with means for removing the fruit from the parent stem and precipitating the fruit into the sack.

The principal object of this invention is to promote the effectiveness of the fruit picker by supplying the rod with means for causing the fruit to be accurately deposited in the gathering sack.

The novelty of this invention resides in the spring jaw of the device and which will be hereinafter fully described and claimed.

In the accompanying drawing forming part of this specification, Figure 1 is a side elevation of a fruit picker constructed in accordance with my invention. Fig. 2 is an end elevation of the fruit picker with the gathering sack removed. Fig. 3 is an enlarged detail view of the spring jaw and its mountings.

Referring now to the drawing, 5 designates a long rod having one of its ends provided with a uniformly reduced portion 6. A block 7 preferably rectangular in contour and cross section is provided centrally with a suitable opening to receive the reduced portion 6, this block being snugly fitted on the reduced end of the rod and rigidly secured thereto by means of a screw 8 or similar connector passed through the side of the block and into the reduced portion 6. Secured to the side faces of the block 6 are the extremities of a frame 9 which may be rectangular, circular or other desired shape and to which is secured a gathering sack 10. The gathering sack 10 is provided in its bottom with an outlet opening and this opening is normally closed by a flap 11 which buttons to the side of the sack as shown or may be otherwise secured thereto. The flap 11 may be unbuttoned when the sack has become filled with fruit and the contents of the sack emptied through the outlet opening in its bottom.

The spring jaw for precipitating the fruit into the sack 10 consists of a substantially annular skeleton frame 12 having its terminals disposed in a sleeve 12' which is fixed to the block and serves to hinge the frame to that side of the block opposite to the gathering sack 10. A strap like brace 13' is terminally connected to the sides of the skeleton frame and braces the same against spreading. The jaw 12 is sufficient in cross dimension to encircle large fruits, such as apples, pears, peaches and the like, the upper side of the frame being employed to strike forcibly the stems of the fruit whereby to break the latter from the parent stem and cause the fruit to gravitate into the gathering sack.

For normally holding the jaw 12 in operative position a curved spring 13 is provided one end of which is equipped with a suitable eye or other means for engaging the top bar of the jaw and the opposite end of which is rigidly secured by a screw or like means to the side face of the block 7 opposite from the gathering sack. The spring curves rearwardly from the jaw as shown so that when a fruit is driven back through the jaw by the impact of the jaw with the parent stem as occasionally happens, the curved spring 13 will obstruct the advance of the fruit and cause the latter to drop into the gathering sack instead of dropping to the ground as heretofore.

For actuating the jaw 12 a wire 14 is secured at one end to the intermediate portion of the spring 13 and is thence led over a sheave 15 mounted for revolution in a suitable recess 15' formed in the side face of the block adjacent the gathering sack and thence led through a metal tube 16 that is secured to the rod 5 and terminates at a point within convenient reach of the operator. The metal tube 16 prevents the wire from being caught by the tree branches as the gathering sack is raised to operative position. Mounted upon rod 5 is a slide 17 to which the extremity of the wire 14 is rigidly secured. By holding the rod 5 in one hand and grasping the slide 17 with the other, the operator may conveniently operate the slide to jerk the wire 14 and cause the jaw 12 to forcibly strike the stem of the fruit, thereby causing the latter to be broken off and precipitated into the gathering sack.

From the foregoing description taken in connection with the accompanying drawing, it is thought that the construction and operation of my invention will be easily understood without a more extended explanation; it being understood that various changes may be made in the minor details of construction within the scope of the appended claims.

What is claimed is:

1. A fruit picker consisting of a portable rod, a gathering sack mounted upon said rod, a skeleton jaw pivotally connected to said rod opposite said sack, an arched spring disposed transversely across the jaw and performing the dual function of opening the jaw and presenting a flat resilient stop for direct contact with the fruit to prevent the escape of fruit rearwardly through the jaw, and means for manually closing the jaw.

2. A fruit picker consisting of a portable rod, a gathering sack mounted upon said rod, a substantially annular skeleton jaw hingedly secured to said rod, an arched leaf spring pivotally secured at one end to the jaw and fixed at its opposite end to said rod, said spring operating to open the jaw, and being oppositely disposed to said sack whereby to precipitate fruit advancing rearwardly through the jaw into the sack, a sheave arranged on said rod, and a pull wire trained over the sheave and connected to said spring for closing the jaw.

In testimony whereof, I affix my signature, in presence of two witnesses.

THOMAS HARRISON HEBERLING.

Witnesses:
A. L. CONVERSE,
W. L. TROXELL.

---

Copies of this patent may be obtained for five cents each, by addressing the "Commissioner of Patents, Washington, D. C."